(12) United States Patent
McBrien

(10) Patent No.: US 6,864,808 B2
(45) Date of Patent: Mar. 8, 2005

(54) SYSTEM AND METHOD FOR PROCESSING A SIGNAL

(75) Inventor: Gary M. McBrien, Glastonbury, CT (US)

(73) Assignee: Goodrich Pump & Engine Control Systems, Inc., West Hartford, CT (US)

(*) Notice: Subject to any disclaimer, the term of this patent is extended or adjusted under 35 U.S.C. 154(b) by 573 days.

(21) Appl. No.: 10/059,622

(22) Filed: Jan. 29, 2002

(65) Prior Publication Data

US 2003/0141917 A1 Jul. 31, 2003

(51) Int. Cl.[7] .............................................. G05S 1/06
(52) U.S. Cl. .............. 341/20; 324/207.18; 324/207.17; 318/657; 340/870.36
(58) Field of Search ...................... 340/870.36; 341/20, 341/35; 324/207.18, 207.17; 318/657

(56) References Cited

U.S. PATENT DOCUMENTS

| | | | |
|---|---|---|---|
| 4,591,795 A | | 5/1986 | McCorkle |
| 4,904,921 A | | 2/1990 | DeVito et al. |
| 4,982,156 A | | 1/1991 | Lewis et al. |
| 5,087,866 A | | 2/1992 | Smith |
| 5,235,274 A | * | 8/1993 | Frazzini et al. ........ 324/207.12 |
| 5,521,496 A | * | 5/1996 | Swadling ................ 324/207.18 |
| 5,617,023 A | * | 4/1997 | Skalski ................... 324/207.17 |
| 5,661,397 A | * | 8/1997 | Deller et al. ........... 324/207.18 |
| 5,777,468 A | * | 7/1998 | Maher .................... 324/207.18 |
| 6,005,387 A | * | 12/1999 | Andermo et al. ...... 324/207.17 |
| 6,617,712 B1 | * | 9/2003 | Dondi .......................... 310/12 |

FOREIGN PATENT DOCUMENTS

JP          10019600          1/1998

OTHER PUBLICATIONS

European Search Report dated May 30, 2003.

* cited by examiner

Primary Examiner—Albert K. Wong
(74) Attorney, Agent, or Firm—David J. Silvia; Edwards & Angell, LLP

(57) ABSTRACT

Analog circuitry is disclosed for conditioning a signal from linear and rotary variable differential transformers having a primary winding, a pair of secondary windings and a movable core. The circuitry includes a unique closed loop negative feedback mechanism which, over time, adjusts the frequency of a voltage controlled oscillator so that a steady-state condition is achieved within the circuitry, whereby the total integrated value of the secondary winding voltages at an integrator remains equal to a reference voltage, thereby reducing the computational burden associated with solving an equation to determine the position of the movable core of the transformer.

22 Claims, 4 Drawing Sheets

SYSTEM AND METHOD FOR PROCESSING A SIGNAL

BACKGROUND OF THE INVENTION

1. Field of the Invention

The subject invention relates to a system and method for processing signals, and more particularly, to signal conditioning circuitry for linear variable differential transformers (LVDT) and rotary variable differential transformers (RVDT).

2. Background of the Related Art

Displacement sensors that produce either digital or analog outputs are well known in the art. Analog output displacement sensors include variable resistors, capacitors in single-coil units, and multiple-coil inductive sensors. Digital output displacement sensors include the linear variable differential transformer (LVDT) and the rotary variable differential transformer (RVDT). These transformers include a moveable core having three windings which sense displacement. LVDTs and RVDTs are used to measure linear or angular displacement and are connected mechanically between the object being sensed and a reference object. The output voltage of the transformer is proportional to the displacement of the moveable core, and can be used to measure the motion or position of a reference object.

The linear variable differential transformer (LVDT) includes a movable magnetic core, a primary winding and two secondary windings. Since there is no contact between the core and the windings, there is no friction and no mechanical wear to limit the life of the transducer. This is especially important in high reliability applications and in hostile environments. As an example, the control surfaces of a fixed or rotary wing aircraft exhibit vibration which would quickly destroy a mechanical contact-type transducer. The position of the magnetic core determines the voltage induced on each of the two secondary windings. When the core is centered relative to the secondary windings, an equal voltage is induced on each secondary winding. This is the balanced or null position. As the core is displaced from the center, or null point, the voltage induced on one secondary winding increases while the voltage on the other secondary winding decreases. The two secondary windings are usually connected in series, and the resulting differential voltage is measured. The phase of the output voltage relative to the primary voltage indicates the direction of displacement relative to the null position. An RVDT sensor operates in a similar manner wherein the movable iron-core rotates about a fixed axis.

In the past, circuitry for converting a signal from an LVDT or RVDT sensor into a reliable output voltage included complex processing methodologies and components, as disclosed for example in U.S. Pat. No. 4,591,765 to McCorkle and U.S. Pat. No. 4,909,921 to DeVito. It would be beneficial therefore to provide a reliable system for conditioning LVDT and RVDT signals that employs relatively simple computational methodologies and relatively fewer and less complex components than prior art signal conditioning systems.

SUMMARY OF THE INVENTION

The subject invention is directed to a system and method of processing a signal for linear variable differential transformers (LVDT) and rotary variable differential transformers (RVDT). The system is defined by an analog signal conditioning circuit that includes a frequency generator for providing an excitation signal to a primary winding of a variable differential transformer, and a voltage controlled oscillator for supplying a reference frequency to a time indexer adapted to set output times at discrete time intervals. Means are provided for sampling output voltages from a pair of secondary windings of the variable differential transformer for use in determining the position P of a movable core of the variable differential transformer as a solution to the equation:

$$P = \frac{(S1 - S2)}{(S1 + S2)}$$

where S1 and S2 represent the output voltages of the secondary windings of the variable differential transformer. A first integrator is operatively associated with the sampling means for integrating the S1 output voltage during a first time interval and for integrating the S2 output voltage during a second time interval.

Means are also provided for determining a sampling error based on the total integrated value of the S1 output voltage and the S2 output voltage during the second time interval. The sampling error is determined when the total integrated value of the S1 output voltage and the S2 output voltage is less than or greater than the reference voltage. The value of the sampling error is determined by subtracting the output voltage of the first integrator from the reference voltage.

A second integrator is provided for integrating the sampling error during a third time interval so as to generate a value that is used to adjust the reference frequency supplied by the voltage controlled oscillator. This is done by way of a negative feedback loop that functions in such a manner so that the total integrated value of the S1 output voltage and the S2 output voltage remains equal to a reference voltage. As a result, the integrated value of the S1 and S2 output voltages, and hence the denominator of the equation set forth above is a constant. In essence, the adjustment of the reference frequency supplied by the voltage controlled oscillator results in an adjustment of the duration of the discrete time intervals, such that the integration time of the first and second integrators is lengthened or shortened depending upon the value of the sampling error.

Means are also provided for resetting the first integrator during a fourth time interval, whereupon the first integrator integrates the S1 output voltage during a fifth time interval and a negative S2 output voltage is integrated during a sixth time interval. The output of the first integrator is provided during a seventh time interval which is equal to the integrated value of the difference between the S1 output voltage and the S2 output voltage. This value is used in solving the equation set forth above, the solution of which does not require division since the denominator of the equation is equal to a constant. This significantly reduces the computational burden on the system.

The method of the subject invention includes a calibration cycle and a signal conversion cycle. During the calibration cycle, the method includes the step of sampling output voltages from a pair of secondary windings of a variable differential transformer for use in determining the position P of a movable core of the variable differential transformer as a solution to the equation:

$$P = \frac{(S1 - S2)}{(S1 + S2)}$$

where S1 and S2 represent the output voltages of the secondary windings of the variable differential transformer. Also during the calibration cycle, the method includes the steps of integrating the S1 output voltage during a first time interval, integrating the S2 output voltage during a second time interval, determining a sampling error during the second time interval based upon the total integrated value of the S1 output voltage and the S2 output voltage, integrating the sampling error during a third time interval, adjusting the frequency of the voltage controlled oscillator based on the integrated value of the sampling error so that the total integrated value of the S1 output voltage and the S2 output voltage remains equal to a reference voltage, and resetting the first integrator during a fourth time interval.

During the signal conversion cycle, the method includes the steps of integrating the S1 output voltage during a fifth time interval, integrating the negative S2 output voltage during a sixth time interval, providing the output of the first integrator during a seventh time interval which is equal to the integrated value of the difference between the S1 output voltage and the S2 output voltage. This value is used in solving the equation, the denominator of which is equal to the constant reference voltage. The first integrator is then reset during an eighth time interval.

Preferably, during the calibration cycle, the sampling error is determined when the total integrated value of the S1 output voltage and the S2 output voltage is less than or greater than the reference voltage, and the value of the sampling error is determined by subtracting the output voltage of the first integrator from the reference voltage.

The subject invention is also directed to a system for processing a signal wherein the means for conditioning the sampled S1 and S2 output voltages includes an automatic gain control (AGC) amplifier that is operatively associated with means for sequentially switching the input signal thereto between the sampled S1 and S2 output voltages. The switched AGC amplifier operates to equate the sum of the sampled S1 and S2 output voltages with a constant reference voltage. As in the previous configuration, the same gain setting (k) on the AGC amplifier that was sufficient to make the $(S1+S2)*k=V_{ref}$ (where k is the AGC gain) is used to determine $(S1-S2)*k$, so that the denominator of the equation is again held constant, and division is not necessary. As above, the position P of the movable core is equal to the difference between the sampled S1 and S2 output voltages.

These and other aspects of the subject invention will become more readily apparent to those having ordinary skill in the art from the following detailed description of the invention taken in conjunction with the drawings described herein below.

BRIEF DESCRIPTION OF THE DRAWINGS

So that those having ordinary skill in the art to which the subject invention pertains will more readily understand how to employ the system and method of the subject invention, preferred embodiments thereof will be described in detail hereinbelow with reference to the drawings, wherein.

DETAILED DESCRIPTION OF PREFFERED EMBODIMENTS

Figure 1:
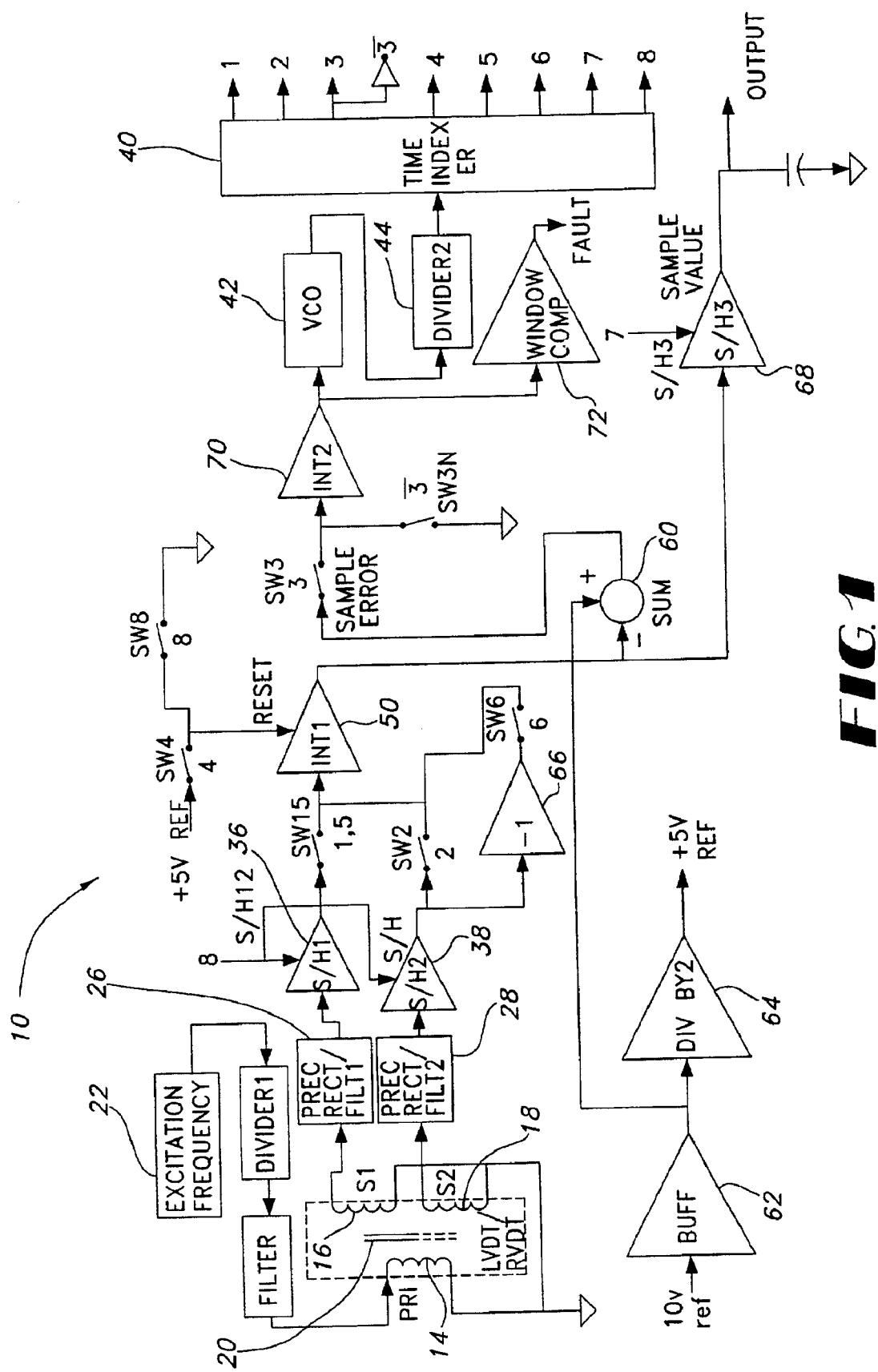
FIG. 1 is a schematic representation of an analog conditioning circuit for LDVT and RDVT sensors constructed in accordance with a preferred embodiment of the subject invention.

Referring now to the drawings, there is illustrated in FIG. 1 an analog signal conditioning circuit for processing LVDT and RVDT signals constructed in accordance with a preferred embodiment of the subject invention and designated generally by reference numeral 10. Conditioning circuit 10 is operatively associated with a LVDT/RVDT 12 having a primary winding 14, secondary windings 16 and 18 designated S1 and S2, respectively, and a movable core 20. The primary winding 14 is powered by and receives a divided and filtered excitation signal from an AC frequency generator 22, and output signals generated by the secondary windings 16 and 18 are proportional to the displacement of the movable core 20. The secondary windings 16 and 18 are connected in opposing series so that the when the core is at a centered null position, the sum of the output signals from the secondary windings is zero. As the core 20 moves relative to the primary winding 14, the signal in one of the secondary windings 16,18 increases while the signal in the other secondary winding 16,18 decreases. The position of the core 20, and hence a reference object associated therewith, is determined in accordance with the following equation:

$$\frac{(S1 - S2)}{(S1 + S2)} \qquad (1)$$

Thus, the determination of the output position of the sensor is based upon the difference between the output signals from two secondary windings, divided by the sum of the output signals from the two windings. In a complex conditioning circuit employing microprocessors, this equation can be solved with relative ease. However, in the analog circuit as disclosed herein, division is a difficult mathematical process. Thus, the conditioning circuit of the subject invention employs a unique mechanism to adjust the output signals of the secondary windings so that the denominator of the equation is always a constant value. Consequently, the equation, and hence the output position of the sensor, is determined without division.

In the description of the conditioning circuit, which follows, reference will be made to indexed time intervals numbering from 1 through 8. These precise output time intervals, which are set by a decoder device 40 configured to operate as time indexer, are equal in duration (e.g., 1 millisecond) and occur within the calibration and conversion cycles of conditioning circuit 10. The time indexer receives a reference frequency from a Voltage Controlled Oscillator (VCO) 42 that is divided by a frequency divider 44. The integrated signal generated by conditioning circuit 10 during the calibration and conversion cycles is graphically represented in FIG. 2.

Referring to FIG. 1, precision rectifiers 26 and 28 are operatively associated with secondary windings 16 and 18, respectively, for converting the output signals therefrom to DC output voltages. During time interval 8, sample and hold amplifiers 36 and 38 receive and hold DC output voltage S1 and S2 of the secondary windings 16 and 18 from precision rectifiers 26 and 28, respectively. The sample and hold devices 36, 38 obtain a voltage reading at a precise time so as to ensure the S1 and S2 output voltage correspond to the same position of the core 20.

Figure 2:
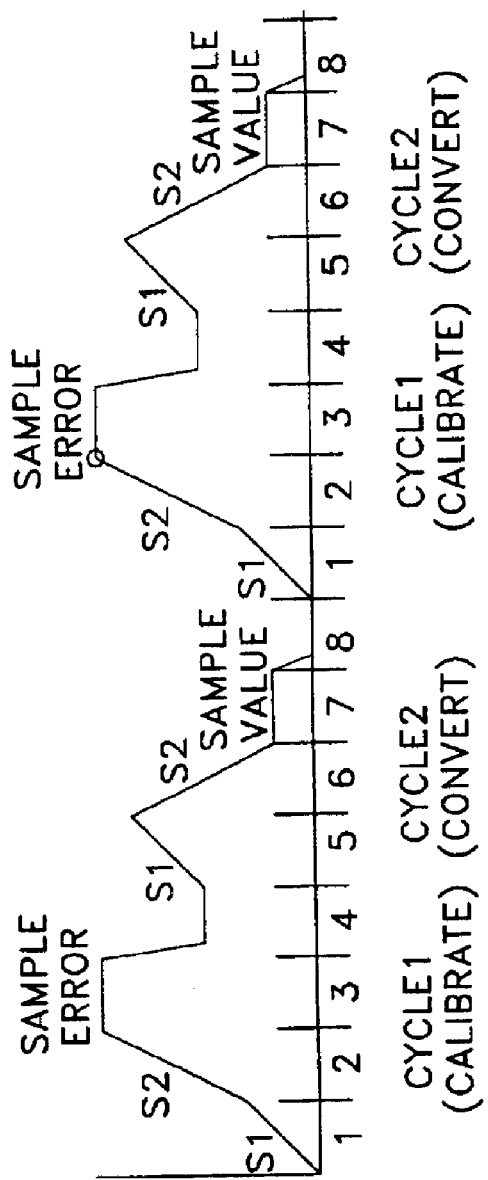
FIG. 2 is a graphical representation of an integrated sampled signal during calibration and conversion cycles.

With continuing reference to FIG. 1 in conjunction with FIG. 2, during the calibration cycle of the circuit, when switch SW1S is closed at time interval 1, the S1 output voltage from secondary winding 16 sets the initial rate or slope of integration for the first integrator 50. Then, at time interval 2, switch SW1S opens and switch SW2 closes so that the S2 output voltage from secondary winding 18 drives the slope of integrator 50 upwardly. At time interval 3, the output from integrator 50 is sent to summing junction 60. There, the output from integrator 50 is subtracted from a 10V reference voltage to determine whether the total integrated value of the secondary winding voltages (S1+S2) is less than or greater than the reference voltage from buffer 62.

Thereafter, when switch SW3 is closed at time interval 3, any non-zero error (positive or negative) is provided as an input value to the second integrator 70 and is used to trim (i.e., increase or decrease) the frequency of the VCO 42. In essence, if the total integrated value of secondary winding voltages (S1+S2) is less than or more than the 10V reference voltage, the time interval in which integrator 70 functions will either lengthen or shorten, and the time period in which integrator 50 functions will proportionately lengthen or shorten. This serves as a closed loop negative feedback mechanism which, over time, adjusts the frequency of VCO 42 so that a steady-state condition is achieved within the circuit, whereby the total integrated value of the secondary winding voltages (S1+S2) at integrator 50 remains equal to the reference voltage from buffer 62. Consequently, the denominator of equation (1) remains constant, thereby eliminating a computational burden.

It should be noted that at any time interval other than time interval 3, switch SW3N is closed so that integrator 70 goes to ground and the output value therefrom is held constant. A window comparator 72 is connected to integrator 70 to provide fault checking if the output value from integrator 70 drifts too far from a calibrated value. In essence, the comparator monitors the closed loop negative feedback mechanism to ensure that the time interval for integration does not increase or decrease beyond predetermined limits.

During time interval 4, integrator 50 is reset to 5V or one-half of the 10V reference voltage by way of voltage divider 64. More particularly, at time interval 4, switch SW4 closes to allow bipolar operation of integrator 50, and enabling a unipolar output therefrom. During time interval 5, switch SW1S is again closed, allowing the S1 output voltage to feed integrator 50, causing the slope of integration to increase positively. At interval 6, switch SW6 is closed and the negative value of the S2 output voltage is delivered to integrator 50 by way of voltage inverter 66. The negative S2 output voltage changes the slop of integration, causing integrator 50 to integrate downwardly, as shown in FIG. 2.

During time interval 7, switch SW7 is closed and the sample value from integrator 50, which is actually the sum of the 5V reference voltage, the integrated value of the S1 output voltage, and the integrated value of the negative S2 output voltage is latched to the output by way of sample and hold buffer 68. Since the integrated value of (S1+S2) is constant, the integrated value of (S1−S2) is normalized, and the position of the reference object can be determined without dividing the integrate value of (S1−S2) by the integrated value of (S1+S2). During interval 8, switch SW8 is closed, whereby and integrator 50 is reset to zero by going to ground. Concomitantly, new sample and hold values for S1 and S2 output voltages are captured by devices 36 and 38.

Those skilled in the art should readily appreciate that the accuracy of the circuit shown in FIG. 1 is dependent upon the accuracy of the two sample and hold buffers, the difference amplifier, the output buffer and the inverting stage. All of these have gains of 1 or −1, and thus the circuit is extremely accurate.

Figure 3:
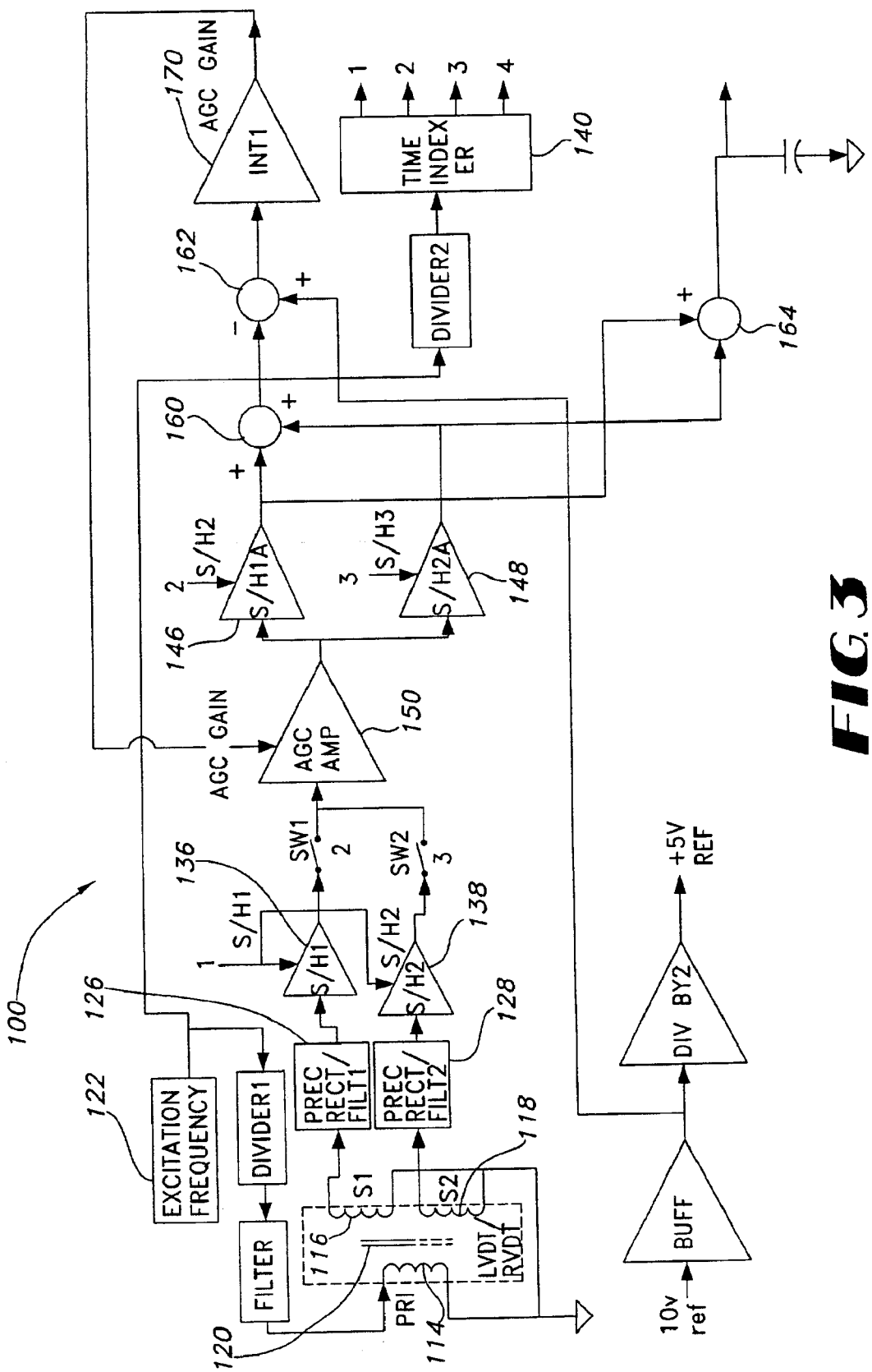
FIG. 3 is a schematic representation of another conditioning circuit for LDVT and RDVT sensors which employs a switched Automatic Gain Control (AGC) amplifier.

Referring now to FIG. 3, there is illustrated another conditioning circuit constructed in accordance with the subject invention and designated generally by reference numeral 100. The basic difference between this circuit and the previously described circuit is the means by which the sampled signals are conditioned. In this instance, signal conditioning is accomplished by a sequentially switched Automatic Gain Amplifier (AGC), rather than by a pair of integrators. In describing conditioning circuit 100, reference will be made to indexed time intervals numbering from 1 through 4. These precise output time intervals are generated by a time indexer 140, and are equal in duration (e.g., 1 millisecond).

As illustrated, conditioning circuit 100 is operatively associated with a LVDT/RVDT 112 having a primary winding 114, secondary windings 116 and 118 designated S1 and S2, respectively, and a movable core 120. Precision rectifiers 126 and 128 are operatively associated with secondary windings 116 and 1118, respectively. The primary winding 114 is powered by and receives a divided and filtered excitation signal from an AC frequency generator 122. Sample and hold buffers 136 and 138 are operatively associated with precision rectifiers 126 and 128 for sampling and holding precision rectified S1 and S2 output voltage signals, respectively.

Figure 4:
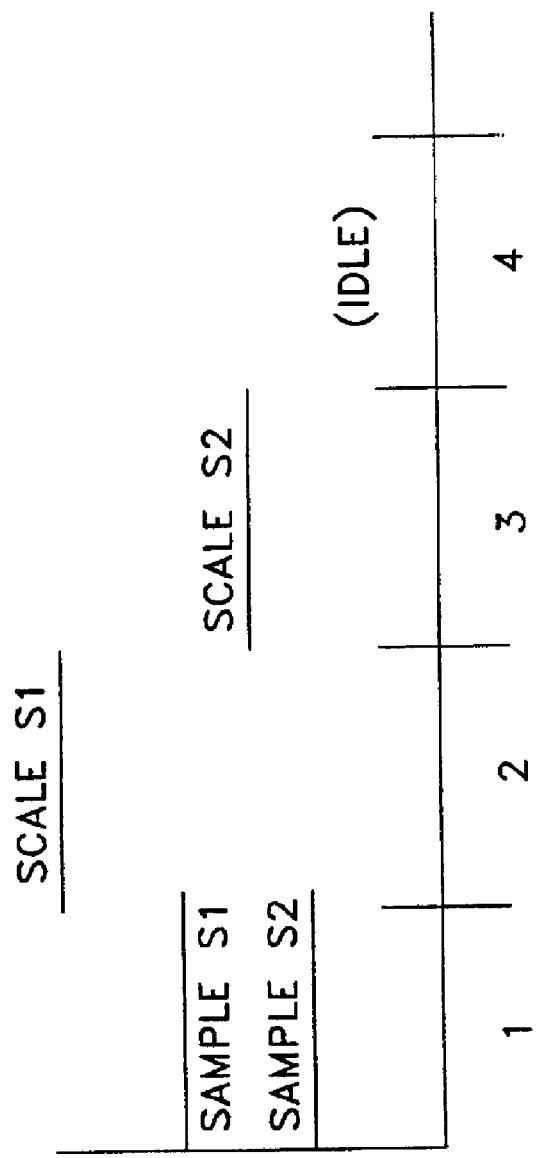
FIG. 4 is a graphical representation of the sampled and scaled signal produced by the conditioning circuit of FIG. 3.

Referring to FIG. 4 in conjunction with FIG. 3, at time interval 1, sample and hold buffers 136 and 138 receive and hold DC output voltage S1 and S2 of the secondary windings 116 and 118. At time interval 2, switch SW1 closes allowing the AGC amplifier 150 to receive the S1 output voltage signal from buffer 136. The S1 output voltage signal is appropriately scaled by the AGC amplifier 150 and held by sample and hold buffer 146. Then, at time interval 3, switch SW2 closes allowing the AGC amplifier 150 to receive the S2 output voltage signal from buffer 138. The S2 output voltage signal is appropriately scaled by the AGC amplifier 150 and held by sample and hold buffer 148.

The S1 and S2 output voltage signal from the AGC amplifier 150 that have been amplified and held by buffers 146, 148 follow two discrete paths from this point. On one path (the conditioning path), the amplified S1 and S2 output voltages (from sample and hold buffers 146, 148) are added together at summing junction 160, and the additive signal is then compared to a buffered constant reference voltage (e.g., 10V) at summing junction 162 to facilitate additional scaling by the AGC amplifier 150 using the gain from integrator 170 in such as manner so that the sum of the S1 and S2 output voltages is equal to a constant reference voltage. On the second path, the difference between the amplified S1 and S2 output voltages (from sample and hold buffers 146, 148) is determined at summing junction 164, the result of which provides the position P of the core 120.

Although the system and method of the subject invention has been described with respect to preferred embodiments, those skilled in the art will readily appreciate that changes and modifications may be made thereto without departing from the spirit and scope of the present invention as defined by the appended claims.

What is claimed is:

1. A system for processing a signal comprising:
   a) a frequency generator for providing an excitation signal to a primary winding of a variable differential transformer;

b) means for sampling output voltages from a pair of secondary windings of the variable differential transformer for use in determining the position P of a movable core of the variable differential transformer as a solution to the equation $$P = \frac{(S1 - S2)}{(S1 + S2)}$$

where S1 and S2 represent the output voltages of the secondary windings of the variable differential transformer; and c) means for conditioning the sampled S1 and S2 output voltages in such a manner so that the sum of the conditioned S1 and S2 output voltages is equal to a constant reference voltage, whereby the position P is equal to the difference between the S1 output voltage and the S2 output voltage.

2. A system as recited in claim 1, wherein the means for conditioning the sampled S1 and S2 output voltages includes an automatic gain control amplifier.

3. A system as recited in claim 2, wherein means are provided for sequentially switching the input signal to the automatic gain control amplifier between the sampled S1 and S2 output voltages.

4. A system as recited in claim 1, wherein the means for conditioning the sampled S1 and S2 output voltages includes a first amplifier configured to integrate the sampled S1 output voltage during a first time interval and a second amplifier configured to integrate the sampled S2 output voltage during a second time interval.

5. A system as recited in claim 4, further comprising a voltage controlled oscillator for supplying a reference frequency to a time indexer adapted and configured to set output times at discrete time intervals.

6. A system as recited in claim 1, wherein the means for sampling output voltages includes first and second sample and hold buffers, for sampling and holding precision-rectified S1 and S2 output voltage signals, respectively.

7. A system for conditioning a signal comprising:

a) a frequency generator for providing an excitation signal to a primary winding of a variable differential transformer;

b) a voltage controlled oscillator for supplying a reference frequency to a time indexer adapted and configured to set output times at discrete time intervals;

c) means for sampling output voltages from a pair of secondary windings of the variable differential transformer for use in determining the position P of a movable core of the variable differential transformer as a solution to the equation:

$$P = \frac{(S1 - S2)}{(S1 + S2)}$$

where S1 and S2 represent the output voltages of the secondary windings of the variable differential transformer;

d) a first integrator operatively associated with the sampling means for integrating the S1 output voltage during a first time interval and the S2 output voltage during a second time interval;

e) means for determining a sampling error during the second time interval based upon the total integrated value of the S1 output voltage and the S2 output voltage;

f) a second integrator for integrating the sampling error during a third time interval so as to generate a value for adjusting the reference frequency supplied by the voltage controlled oscillator so that the total integrated value of the S1 output voltage and the S2 output voltage remains equal to a constant reference voltage; and g) means for resetting the first integrator during a fourth time interval, whereby the first integrator integrates the S1 output voltage during a fifth time interval and a negative S2 output voltage during a sixth time interval, such that the output of the first integrator during a seventh time interval is the integrated value of the difference between the S1 output voltage and the S2 output voltage of the secondary windings which is used in the solution of the equation, the denominator of which is equal to the constant reference voltage.

8. A system as recited in claim 7, wherein adjustment of the reference frequency supplied by the voltage controlled oscillator results in an adjustment of the duration of the discrete time intervals, such that the integration time of the first and second integrators is adjusted.

9. A system as recited in claim 7, further comprising means for generating a reference voltage.

10. A system as recited in claim 8, wherein the sampling error is determined when the total integrated value of the S1 output voltage and the S2 output voltage is less than or greater than the reference voltage.

11. A system as recited in claim 9, wherein the sampling error is determined by subtracting the output voltage of the first integrator from the reference voltage.

12. A system as recited in claim 8, wherein the first integrator is reset during the fourth time interval with a voltage obtained by dividing the reference voltage in half.

13. A system as recited in claim 7, further comprising means for detecting whether the value of the integrated sampling error drifts beyond a predetermined limit.

14. A system as recited in claim 7, further comprising means for converting the excitation signal from alternating current to direct current.

15. A method of conditioning a signal comprising the steps of:

a) generating an excitation signal to a primary winding of a variable differential transformer;

b) sampling output voltages from a pair of secondary windings of the variable differential transformer for use in determining the position P of a movable core of the variable differential transformer as a solution to the equation $$P = \frac{(S1 - S2)}{(S1 + S2)}$$

where S1 and S2 represent the output voltages of the secondary windings of the variable differential transformer; and c) conditioning the sampled S1 and S2 output voltages in such a manner so that the sum of the S1 and S2 output voltages is equal to a constant reference voltage, whereby the position P is equal to the difference between the S1 output voltage and the S2 output voltage.

16. A method of conditioning a signal comprising the steps of:

a) providing an excitation signal to a primary winding of a variable differential transformer;

b) supplying a reference frequency to a time indexer adapted and configured to set output times at precise time intervals;

c) sampling output voltages from a pair of secondary windings of the variable differential transformer for use in determining the position P of a movable core of the variable differential transformer as a solution to the equation:

$$P = \frac{(S1 - S2)}{(S1 + S2)}$$

where S1 and S2 represent the output voltages of the secondary windings of the variable differential transformer;

d) integrating the S1 output voltage during a first time interval;

e) integrating the S2 output voltage during a second time interval;

f) determining a sampling error based upon the S1 and S2 output voltages during the second time interval;

g) integrating the sampling error during a third time interval;

h) adjusting the frequency of the voltage controlled oscillator based on the integrated value of the sampling error so that the total integrated value of the S1 output voltage and the S2 output voltage remains equal to a constant reference voltage;

i) resetting the first integrator during a fourth time interval;

j) integrating the S1 output voltage during a fifth time interval;

k) integrating the negative S2 output voltage during a sixth time; interval;

l) providing the output of the first integrator during a seventh time interval which is the integrated value of the difference between the S1 output voltage and the S2 output voltage of the secondary windings which is used in the solution of the equation, the denominator of which is equal to the constant reference voltage; and m) resetting the first integrator during an eighth time interval.

17. A method according to claim 16, further comprising the step of generating the reference voltage.

18. A method according to claim 16, wherein the sampling error is determined when the total integrated value of the S1 output voltage and the S2 output voltage is less than or greater than the reference voltage.

19. A method according to claim 16, wherein the sampling error is determined by subtracting the output voltage of the first integrator from the reference voltage.

20. A method according to claim 16, wherein the first integrator is reset during the fourth time interval with a voltage obtained by dividing the reference voltage in half.

21. A method according to claim 16, further comprising the step of monitoring whether the value of the integrated sampling error drifts beyond a predetermined limit.

22. A method according to claim 16, further comprising the step of converting the excitation signal from alternating current to direct current.

* * * * *